July 2, 1946. P. GEREN 2,403,100
CHUCK
Filed Aug. 18, 1944
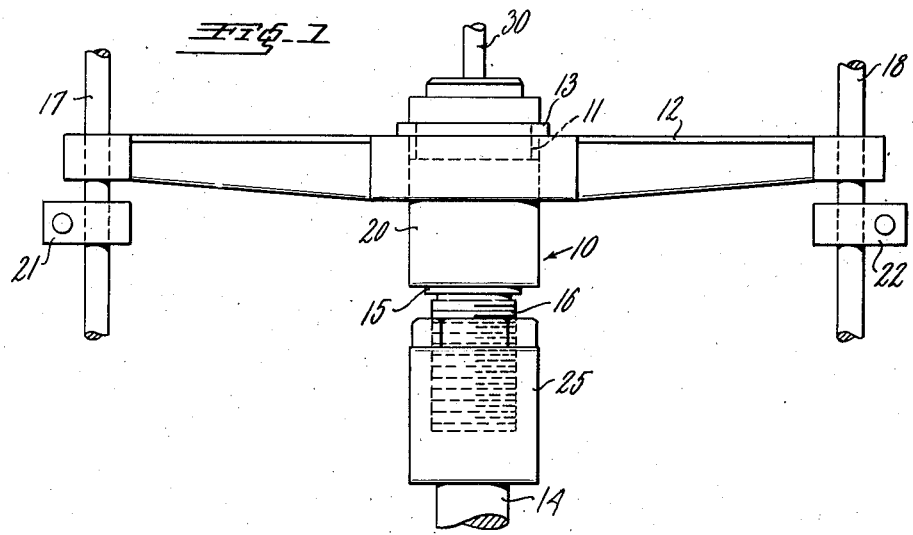
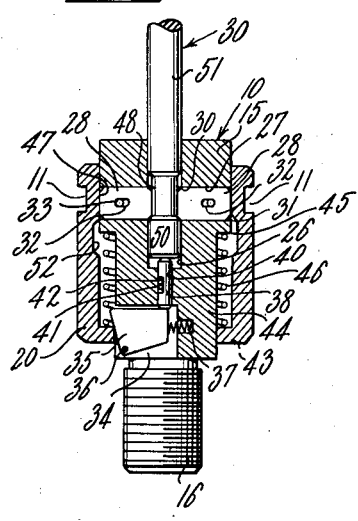
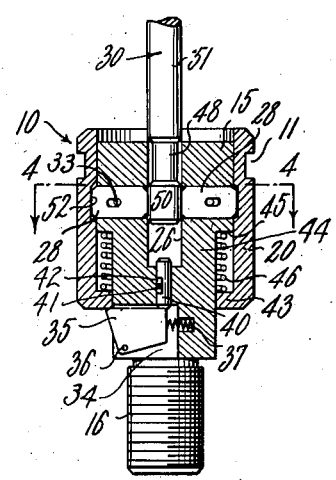
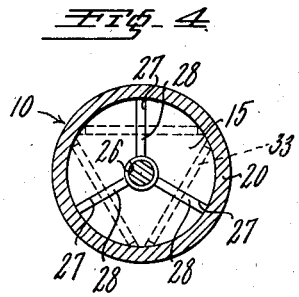
INVENTOR
PHILIP GEREN
BY
*Richard A. Marsen*
ATTORNEY Patented July 2, 1946

2,403,100

UNITED STATES PATENT OFFICE 2,403,100

CHUCK

Philip Geren, Grand Rapids, Mich., assignor, by mesne assignments, to Lear, Incorporated, Grand Rapids, Mich., a corporation of Illinois Application August 18, 1944, Serial No. 550,018

3 Claims. (Cl. 279—74)

This invention relates to a chuck, and more particularly to an automatically operable chuck particularly adapted for use with a broaching machine.

It is among the objects of this invention to provide a chuck comprising a pair of relatively movable members adapted to hold two gripping elements in tool retaining position, and movable to release said tool retaining elements; to provide such a chuck including latching means operable upon relative movement of said members to retain the members in a tool disengaging position; to provide such a chuck including a pair of relatively movable members normally operated to a tool gripping position by insertion of a tool in the chuck; and to provide such a chuck including a pair of relatively movable members and automatic means operable to move said members from a tool retaining position to a tool releasing position.

These and other objects, advantages and features of the present invention will be apparent from the following description and accompanying drawing. In the drawing:

Fig. 1 is an elevation view of a chuck embodying the present invention in operative relation with associated parts of a broaching machine.

Fig. 2 is a longitudinal sectional view of the chuck in tool gripping position.

Fig. 3 is a longitudinal sectional view of the chuck in tool releasing position.

Fig. 4 is a cross-sectional view on the line 4—4 of Fig. 3.

Generally speaking, a chuck according to the present invention comprises an inner tool receiving member and a sleeve slidably mounted thereon. Tool gripping elements are slidably mounted in the inner member and arranged to engage the neck of a tool provided with a shank, a neck and a head. In one relative position, the sleeve holds the gripping elements in engagement with the tool. In another relative position of the members, the sleeve permits outward movement of the gripping elements to release the tool. When the chuck elements are moved to this latter relative position, automatic latching means maintain them in such position. Such automatic latching means is operable by insertion of a tool into the chuck to release the elements, permitting them to move to a tool gripping position.

Referring to Fig. 1, a chuck 10 is shown in operative relation with parts of a vertical broaching machine. The broaching machine may be of the type described and claimed in my copending application Serial Number 550,017, filed August 18, 1944, for "Vertical broaching machine," assigned to the same assignee as this case. The chuck comprises an inner tool receiving member 15 and a sleeve 20 slidably mounted thereon. Sleeve 20 is provided with an outer annular recess 11, and a cross arm 12 is mounted on the sleeve adjacent this recess. Cross arm 12 is provided with an aperture slightly larger in diameter than the external diameter of sleeve 20 and is held in position on the sleeve by a U-shaped member or washer 13, which engages in the recess 11.

The associated parts of the broaching machine comprise a member 25 forming part of a vertically movable cross head and having threaded engagement with an extension 16 on the inner member 15. As described in said copending application, a piston 14 is connected to cross head 25 and is adapted to effect vertical movement of the cross head. Such vertical movement causes a tool, such as a broach 30 secured in chuck 10, to be moved in operative relation to a work piece, not shown.

During vertical movement of cross head 25 and chuck 10, member 12 slides on rods 17 and 18. Adjustable stops 21 and 22 are mounted on rods 17 and 18, and, at a predetermined point in the downward movement of cross head 25 and chuck 10, engage arm 12 to cause relative movement of sleeve 20 with respect to member 15. In a manner to be described more fully hereinafter, such relative movement effects automatic release of tool 30 from the chuck.

Referring more specifically to Figs. 2, 3 and 4, the elements of the chuck are therein shown in their tool engaging position. Body member 15 is provided with an axial tool receiving bore 26 extending more than half way through the body member. A plurality of radial slots 27 are formed in body member 15 and intersect bore 26. Gripping elements 28 are mounted in slots 27 for radial movement with respect to bore 26; and are provided with inner and outer chamfered ends 30 and 31 and with elongated slots 32. Pins 33 extend through slots 32 and across slots 27 to limit the range of movement of members 28 in slots 27.

A longitudinal slot 34 is formed in the lower end of body member 15 and a latching plate 35 is pivotally mounted in this slot. Latching plate 35 is trapezoidal in shape, and its lower left corner is pivotally connected to a pin 36. A spring 37 normally urges plate 35 to the position shown in Figs. 2 and 3. An aperture 38 is formed coaxial with bore 26 and connects this bore and slot 34. Slidably mounted in aperture 38 is a pin 40 whose range of movement is limited by a cross pin 41 extending across aperture 38 and engaging a longitudinal groove 42 in pin 40.

Sleeve 20 is slidably mounted on member 15 and is formed with a lower inturned flange 43. Body member 15 is provided with a reduced portion 44 forming a shoulder 45. A coil spring 46 surrounds portion 44 and abuts flange 43 and shoulder 45, normally urging sleeve 20 to the position shown in Fig. 2.

In such position, the inner surface 47 of sleeve 20 engages gripping plates 28 urging them radially inwardly against the neck 48 of broach 30. Neck 48 is chamfered in the same manner as are the ends of plates 28, and connects head 50 of the broach to shank 51 thereof. Sleeve 20 is also formed with an internal chamfered annular recess 52 which forms a space into which plates 28 may be moved outwardly from bore 26.

Normally, body 15 and sleeve 20 occupy the position shown in Fig. 2, in which plates 28 grip the neck 48 of a broach 30 inserted in bore 26. During downward movement of chuck 10, arm 12 (Fig. 1) engages stops 21 and 22 adjustably mounted on rods 17 and 18. Such engagement effects movement of sleeve 20 from the position shown in Fig. 2 to that shown in Fig. 3, compressing spring 46 between flange 43 and shoulder 45. When sleeve 20 clears latch plate 35, the latter is moved counter-clockwise under the influence of spring 37, to snap into position behind flange 43, locking sleeve 20 in the position shown in Fig. 3. In such position, annular recess 52 is positioned adjacent slots 27 and broach 30 may then be removed from the chuck by pulling the same out of bore 26. During such movement, the chamfered edges of neck 48 cooperate with the chamfered ends of plates 28 to force the plates outwardly into recess 52, releasing the broach.

In the normal operation of the broaching machine with which the chuck is particularly designed to cooperate, chuck 10 is then returned to the starting position of the broaching stroke. A new work piece is placed in the broaching machine and broach 30 is inserted through the work piece and into the bore 26. In its downward movement, broach 30 engages pin 40 moving the same downwardly to force plate 35 to rotate in a clockwise direction. This releases sleeve 20, which is moved, under the influence of spring 46, from the position shown in Fig. 3 to that shown in Fig. 2. During such movement, the surface 47 of sleeve 20 is brought into engagement with plates 28 forcing the same inwardly toward bore 26 to engage neck 48 of broach 30 and retain the same assembly to the chuck.

The described chuck is particularly effective for providing quick attachment and release of a tool thereto. When a tool is inserted in the chuck, it is securely latched therein, and can only be removed after relative movement of body 15 and sleeve 20. When body 15 and sleeve 20 are moved to the releasing position, they are latched in such position by latch plate 35, and can only be released by movement of pin 40. Normally pin 40 is moved only when a new tool is inserted in the chuck, and, in such movement, effects automatic connection of the tool to the chuck.

While a specific embodiment of the invention has been shown and described in detail in order to illustrate the application of the principles thereof, it will be understood by those skilled in the art that the invention may be otherwise embodied without departing from such principles.

What is claimed is:

1. A chuck adapted to grip a tool having a shank, a head and a chamfered neck joining such shank and head, said chuck comprising, in combination, a pair of relatively movable members; gripping elements movably mounted in one of said members; said members in one relative position retaining said elements in gripping engagement with the neck of the tool and in another relative position releasing said elements from gripping engagement with the neck of the tool; latching means operable upon movement of said members to such other relative position to retain said members in such other relative position; and means operable by insertion of the tool in said chuck for releasing said latching means.

2. A chuck adapted to grip a tool having a shank, a head and a chamfered neck joining such shank and head, said chuck comprising, in combination, a body member having a longitudinal tool receiving bore and a plurality of lateral apertures intersecting said longitudinal bore; gripping elements slidably mounted in said apertures; a sleeve member slidably mounted on said body member and having a surface slidably engaging said body member and arranged to engage said elements to move the same into said bore to engage the neck of the tool to lock the tool in said chuck, said sleeve member having an inner annular recess adapted to be aligned with said apertures to provide for outward movement of said gripping elements to release the tool from said chuck; resilient means normally urging said sleeve member into a position wherein said surface engages said elements; a device operable to move said sleeve member into a position wherein said annular recess is aligned with said apertures; latching means rendered effective by such movement to retain said sleeve member in said last-named position; and means operable by insertion of the tool in said bore for releasing said latching means.

3. A chuck comprising, in combination, a body member having a longitudinal bore extending part way therethrough; a plurality of transversely aligned lateral slots intersecting said bore; a longitudinal slot beyond the inner end of said bore and an aperture aligned with said bore and connecting the same with said longitudinal slot; elements slidably mounted in said radial slots; a sleeve having a surface slidably engaging said body member and arranged to engage said elements to move the same into said bore, said sleeve having an inner annular recess adapted to be aligned with said radial slots to provide for outward movement of said elements; a latching member pivotally mounted in said longitudinal slot; a spring normally urging said latching member radially outwardly from said slot; resilient means normally urging said sleeve into a position wherein said surface engages said elements; a device operable to move said sleeve into a position wherein said annular recess is aligned with said apertures and the end of said sleeve clears said latching member, said spring moving said latching member outwardly to engage the end of said sleeve and retain said sleeve in such position; and means for moving said latching member inwardly to release said sleeve, said last-named means comprising a pin slidably mounted in said aperture.

PHILIP GEREN.